United States Patent
Fich

[11] Patent Number: 5,598,790
[45] Date of Patent: Feb. 4, 1997

[54] FURNITURE WITH A TUBULAR UNDERFRAME

[75] Inventor: Preben B. Fich, Hillside, United Kingdom

[73] Assignee: IDEAssociates Ltd., Dublin, Ireland

[21] Appl. No.: 307,568

[22] PCT Filed: Apr. 2, 1993

[86] PCT No.: PCT/DK93/00123

§ 371 Date: Sep. 21, 1994

§ 102(e) Date: Sep. 21, 1994

[87] PCT Pub. No.: WO93/19639

PCT Pub. Date: Oct. 14, 1993

[30] Foreign Application Priority Data

Apr. 3, 1992 [DK] Denmark .................... 0459/92

[51] Int. Cl.⁶ ........................................ A47B 47/00
[52] U.S. Cl. ...................... 108/153; 403/171; 403/205
[58] Field of Search ...................... 108/153, 154, 108/157; 403/171, 176, 205, 295, 403

[56] References Cited

U.S. PATENT DOCUMENTS

| | | | |
|---|---|---|---|
| 4,413,570 | 11/1983 | Haigh | 108/153 |
| 4,511,108 | 4/1985 | Ponzellini | |
| 4,630,550 | 12/1986 | Weitzman | 108/153 |
| 4,691,885 | 9/1987 | Lawrance | 108/153 |
| 4,966,341 | 10/1990 | Borsani | 108/153 |

FOREIGN PATENT DOCUMENTS

| | | |
|---|---|---|
| 2351366 | 4/1974 | Germany . |
| 166516 | 3/1988 | Norway . |

*Primary Examiner*—Peter M. Cuomo
*Assistant Examiner*—Gerald A. Anderson
*Attorney, Agent, or Firm*—Kerkam, Stowell, Kondracki & Clarke, P.C.; Edward J. Kondracki

[57] ABSTRACT

A piece of furniture (1) including an upper part (2) and a lower part, the lower part having rails (8) and legs (3, 4, 5, 6, 7,) made of tubes. The legs have an upper tubular end with a tubular connecting piece (9) fixedly connected with and forming an angle with the leg. An assembly device (10, 11, 12, 13, 14) is provided which has two connecting members (30, 31) each having at least two legs (21, 22), one leg of each member being inserted in an end of the connecting piece (9) and at least one other leg of each member being inserted in a tubular end of a rail (8), wherein one of the legs of the assembly device forms an angle with at least one other leg of the assembly device. The connecting members are pressed against an inner side of the tubular rails and connecting pieces by screws passing through holes in the legs of the connecting members, and the legs of the connecting members have a size and shape which substantially fills up an interior of the tubular ends. The screws are accessible through an aperture in a wall of each of the tubular ends of the rails and connecting pieces.

14 Claims, 5 Drawing Sheets

FURNITURE WITH A TUBULAR UNDERFRAME

BACKGROUND OF THE INVENTION

The present invention relates to a piece of furniture comprising an upper part, such as a tabletop, a cupboard or a number of seats, and a lower part comprising rails and legs, in which the rails and legs at least partly consist of tubes, and in which the legs at their upper ends comprise a tubular connecting piece fixedly connected to and forming an angle with the leg, and in which expandable assembly means are used for connecting legs and rails and for the making up of the rails, said assembly means comprising two connecting members inserted in the ends of adjacent tubes and which by means of one or more screws passed through an opening in one of the connecting members are kept pressed against the inner side of the tubes.

Tables are known, in which the rails are made up of oval tubes which are connected with the tubular connecting pieces at the upper part of the legs. In the known table two connecting pieces are welded to each of the legs, said connecting pieces being two pipe stubs perpendicular to one another and having the same cross-section as the rails. The assembly means consist of two tube pieces placed in parallel, said tubes pieces being pressed apart by means of pointed screws, the thread of which is inserted into a thread in the wall of one of the tube pieces, and the front end of which is passed through a hole in the tube wall of the second tube piece. Thus, the assembly means connect two tube ends placed end to end, and the connection is established thereby that the pointed screw, after the two tube pieces have been inserted in the ends of the rail tube and the connecting piece, respectively, is tightened until the two tube pieces have moved so far apart that they press against the inner surface of the flat-oval tubes.

Even though the assembly means in the shape of two parallelly running tubes are not resistant to torsional stress between the joined tube ends, it is still possible to build stable furniture frames provided that the rail extends along the edges of the upper part and connects the frame legs two by two. On account of the lacking resistance to torsional stress of the assembly, a bigger consumption of material should be expected than in connection with a construction fully welded together.

When the rail tubes are placed upright, they contribute very effectively to securing the tabletop against bending. If the rails are placed in the border area of the tabletop, the free height under the table will be considerably reduced, and it may therefore be difficult for those using the table to get room for their legs under the table, a problem which is particularly pronounced in connection with certain working tables, such as terminal tables and typewriter tables. With a view to avoiding said space problem it will be desirable to remove the rails from the edges of the tabletop. By thus keeping one side of the table free of a rail, the possibility will arise of forming a recess in the tabletop for use as a height-adjustable base for a computer keyboard or a typewriter.

With a view to attaining such a retracted position of the frame, the use of a table leg has been suggested, said leg being at its upper end welded together with one end of a connecting tube, which at its other end is welded together with two short tube fittings, to which frame tubes are connected by means of the assembly means mentioned above.

It has, however, turned out in practice to be difficult to establish the assembly between the connecting tube and the two short rail tubes with sufficient precision to avoid having to adjust the parts when assembling the table, the result being that the lower part of the table consisting of table legs and rails becomes awry.

SUMMARY OF THE INVENTION

The object of the present invention is to provide an improved piece of furniture of the type mentioned by way of introduction.

The piece of furniture according to the invention is characteristic in comprising angular the assembly means with two or more legs and in that said legs have such dimensions that they substantially fill out the interior of the tube ends.

The invention is based on the perception that by using angular assembly means provided with at least two legs forming the centre of the assembly between legs and rails it is possible partly to form the rails alone on basis of straight tubes which are simple to make and which may be produced with great precision, partly by means of the angular shape to attain an improved resistance against torsional stress, and that by using assembly means with legs of such dimensions that they fill substantially the whole interior of the tube ends to be assembled a very stable assembly of frame legs and frame is achieved.

The lower part of the piece of furniture according to the invention is thus very simple to produce, as the rails can be made without the use of branched tube units, which one account of the generation of heat during the welding have a tendency of becoming askew.

The piece of furniture according to the invention can as to the design be varied in may ways without leaving the constructional concept. The direction of the connecting piece in relation to the rail tubes may be changed, and the length of the connecting piece or the angle between legs and connecting piece may be changed. With very few components it thus becomes possible to produce furniture systems which vary as to design and function.

The use of straight tubes or tubes which have one bend or angle instead of tube units with branches in several planes furthermore has the advantage that the straight or angular tubes may be manufactured with far better precision than branched tubes, for which reason the assembly of the lower part is considerably facilitated. Furthermore, straight tubes take up less room than branched tubes, which makes the storing and the transport of the tubes cheaper and easier. Moreover, less components are needed for the building up of the lower part of the piece of furniture according to the invention than for the known lower frame mentioned by way of introduction, which reduces the storing costs.

By using assembly means of the type described above a bigger stability of a lower part comprising legs and rails is furthermore achieved, and thereby a more frail and lighter construction may be used.

On account of the improved stability attained by means of the lower part for the piece of furniture according to the invention it is possible for instance for angular tables to use a set of rails, which contrary to a commonly used closed frame of rails only comprises a single tube string extending in the longitudinal direction of the two parts of the table, and to reduce the number of legs, which entails a number of advantages, such as a reduction of the consumption of material, an easier assembly of the table, an easier heightadjustment of the table, an easier cleaning under the table, an increase in the freedom of movement of the users of the table.

For use in the assembly of a connecting piece of one leg with two rail tubes, the assembly means has three legs, the angle between the two of which connecting the frame tubes is normally right, while the angle to the third leg may be different from 90° depending on the design of the piece of furniture. According to a particular embodiment of the invention one leg may in such assembly means form an obtuse angle with a plane through the two other legs. In this embodiment the angle between legs and connecting piece will correspondingly be changed into an obtuse angle, which apart from giving a degree of freedom as to design also makes it possible to reduce the consumption of material. In practice the obtuse angle will be between 120° and 135°.

By assembly of connecting pieces with a frame consisting of a single tube string, two-legged connecting pieces are used, in which the angle between the two legs normally deviates from 90°. According to a preferred embodiment the angle will be 135°.

Usually the upper part, which may be a tabletop or a cupboard, has a diagonal base, normally in the shape of a rectangle. In these cases it is preferred according to the invention to place each frame leg in the area at one of the corners of the upper part in such a way that the longitudinal axis of the connecting piece runs in a vertical plane approximately parallelly with a vertical plane containing the bisector of the upper part corner. By this embodiment an advantageous positioning of the frame legs is obtained for ensuring maximum stability of the piece of furniture and simultaneous an inwards movement of the positioning of the frame tubes in relation to the base of the upper part of the piece of furniture. At the same time the total length of the tubes being part of the lower frame of the piece of furniture is reduced, which reduces partly the weight, partly the consumption of material. The weight reduction can be maximized if the connection piece extends under an obtuse angle in relation to the frame leg.

The distance between the frame and the edge of the upper part of a piece of furniture of the above type is mainly determined by the length of the connecting piece, and for use in for instance common desks the connecting pieces preferably have a length of 10–30 cm.

According to the invention the assembly means, which consist of two connecting members, are made by casting, preferably from plastics, in particular fibre-reinforced plastics, and in one of the connecting members a nut for the screw is placed and in the other connecting member a separate pressure element, against which the screw presses, is mounted.

To obtain maximum stability of the frame manufactured with the assembly means two screws with accompanying nuts and pressure elements may be inserted in each leg. A corresponding stability may according to the invention be attained thereby that the assembly means in the area at the vertex of the angle comprises further means for pressing the two connecting members apart.

These assembly means can be manufactured with great precision and get, though castings normally do not get the same strength as the material in the tubes used, sufficient strength thereby that the legs of the assembly means have such dimensions that they essentially fill out the tubes. In addition to fibre-reinforced plastics mouldable metal, such as aluminum or zamak, may be used.

According to the invention it is preferred to place the pressure elements in the legs of the assembly means in such a way that the screws of each assembly means run in parallel. This embodiment, which is obvious in connection with assembly means, in which the three legs are positioned in the same plane, is particularly advantageous in the cases, where one of the three legs forms an obtuse angle with the remaining legs. It may then be advantageous that the screws run perpendicularly to two of the legs and obliquely in relation to the third leg, or that the screws run perpendicularly to one of the legs and parallelly with the bisector between the other two.

It is preferable according to the invention that the legs on the assembly means border on a middle section adjoining the tubes with a collar of a size corresponding to the wall thickness of the tubes. Apart from contributing to imparting a smooth and pleasant appearance to the lower part assembled from tubular rails, legs and assembly means, the middle section ensures with a collar resting against the tube ends an exact and matching assembly of the frame.

To further ensure a correct assembly of the frame and in particular with using tubular rails and legs with a circular cross-section to increase the resistance of the assembly towards torsional stress a guiding abutment may be placed on the collar in the middle sections, said abutment being adapted to engage a corresponding recess in the end of the connected tube.

The middle section which may have the shape of a prism, or which may have a rounded shape, may according to the invention be provided with a hole, said hole having in the area of the dividing surface of the assembly means a recess for holding a bolt head or a nut. The middle sections thereby form joints, to which it is possible to fasten other components, of which the piece of furniture consists, or to create possibilities for connecting other types of frame legs or carrying columns for rack arrangements.

A particularly advantageous embodiment of the middle section is characteristic in comprising at least one contact face for a tubular supporting column and a central guiding cone for an expansion member for anchoring the supporting column. When tightening the expansion member the supporting column is at the same time pressed against the contact surface, whereby a very rigid and stable, tight connection between the middle section and the supporting column is achieved.

By using the middle section as a centre for adding supporting columns the use of pointed screws for pressing the two connecting members apart in the area at the vertex of the angle is barred. According to the invention said means for pressing the connecting members apart may comprise an externally threaded sleeve, the clear of which is a part of the through-going hole, and the thread of which engages a nut placed in a recess in one of the connecting pieces and the other end of which presses against an annular pressure element.

According to the invention the assembly means are in order to increase the resistance against torsional stress designed in such a way that in the area at the free end of each leg a transverse hole is provided, in which a guiding pin running parallelly with a screw is mounted.

The invention further comprises furniture of the type mentioned by way of introduction, in which the under frame comprises central column legs with support runners mounted at opposite ends of the upper part. According to the invention these pieces of furniture are characteristic in that the assembly means are shaped as a double angle with two parallel legs adapted for being inserted in each of two parallel rail tubes and an oppositely directed central leg adapted for being inserted in a connecting piece on the column leg. Due to the double-angled shape of the assembly means, where the expansion of the opposite legs has a mutually stabilizing effect towards torsional stress, a construction is achieved, which is in particular resistant towards torsional stress.

It is preferable according to the invention that the central leg comprises a two-piece expansion sleeve and means for axial tightening thereof. By using an axial tightening by means of an expansion sleeve instead of a spreading by means of a transverse screw the connection will get increased rigidity through the tigtening established between the end surface of the connecting piece and the assembly means.

BRIEF DESCRIPTION OF THE DRAWINGS

The invention will be described in detail in the following with reference to the drawing, in which.

DETAILED DESCRIPTION OF THE PREFERRED

Figure 1:
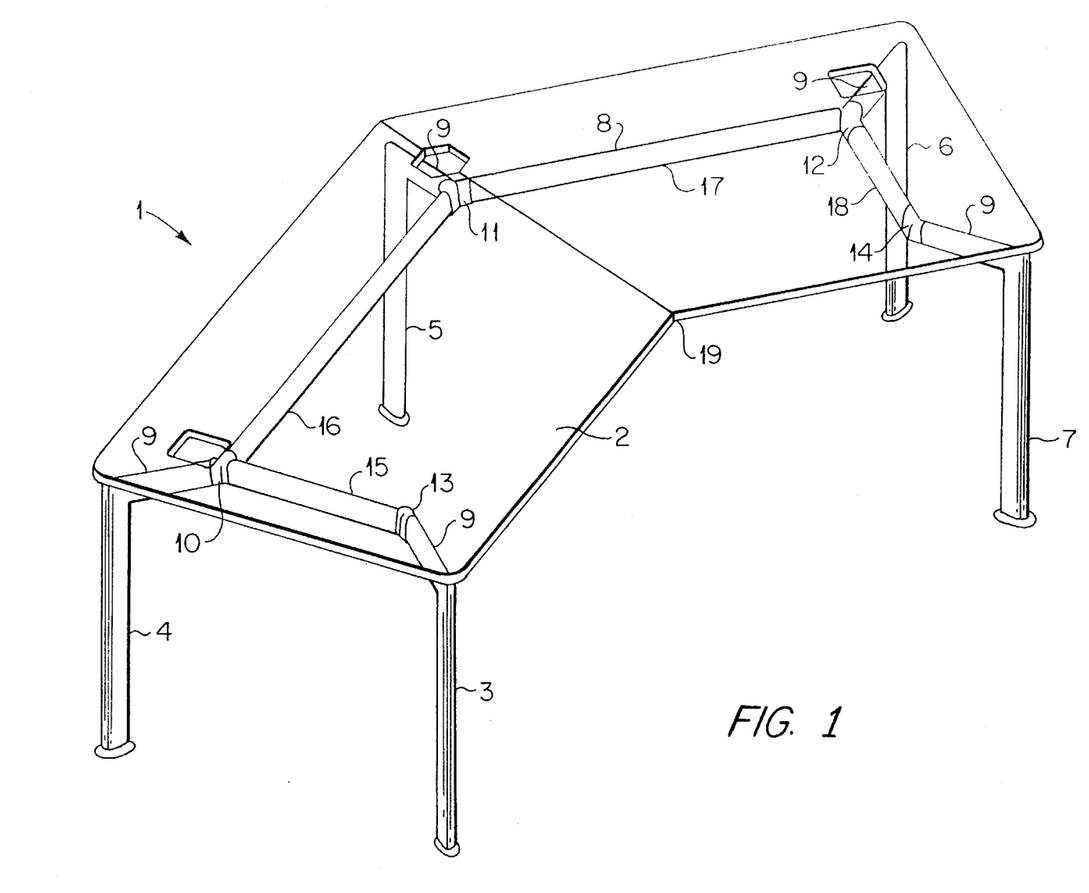
FIG. 1 is a view in perspective of a preferred embodiment of a table according to the invention.

FIG. 1 shows a table 1 comprising an angular tabletop 2, five flat-oval, hollow legs 3,4,5,6,7 and a frame 8 made of flat-oval hollow tubes in an upright position.

Each leg is welded together with an upright connecting piece 9 at an angle of 90°.

The legs with accompanying connecting piece 9 are positioned under their respective corners of the tabletop 2 in such a way that the longitudinal axis of the oblong cross-section of the legs and the longitudinal direction of the connecting pieces 9 converge with the bisectors of said corners.

The legs 4,5,6 are by means of three-legged assembly means 10,11,12 connected to the frame 8, while the legs 3,7 are connected to the frame 8 by means of two-legged assembly means 13,14.

The assembly means 10,12 have such a shape that the angle between the two legs is 90°, while the angles between the said two legs and the third leg both are 135°. The assembly means 11 has such a shape that the angle between the two legs is 135°, while the angles between said two legs and the third leg are 112.5°. The angle between the two legs in the assembly means 13,14 is 135°.

The frame 8 comprises four rail tubes 15,16,17,18, two of which 15,18 are placed at the end of the tabletop 2 in its direction of width, and the remaining two rail tubes 16,17 are placed in the longitudinal directions of the tabletop 2.

The table 1 has great stability partly on account of the position of the legs in relation to the tabletop 2, and partly on account of the connecting piece 9, which makes it possible to place the frame 8 at a distance from the edges of the tabletop 2.

The table according to the invention has improved stability in comparison with known tables. Due to this it is for instance in case of the table shown in FIG. 1 possible to use a frame, which contrary to a commonly used closed frame only comprises one tubular rail in the longitudinal directions of the table, just as there is a possibility of completely leaving out a leg under the corner 19 of the table.

Figure 2:
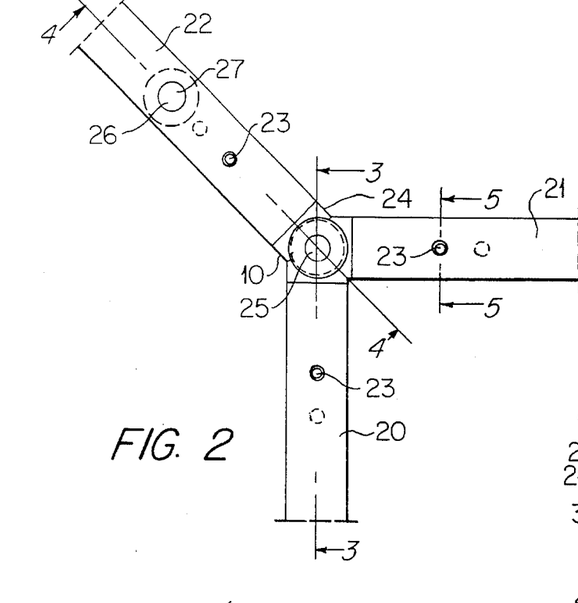
FIG. 2 is a three-legged assembly means, the ends of which are connected to three tubes, of a preferred embodiment according to the invention, seen from below.

FIG. 2 shows a three-legged assembly means 10 consisting of a fibre-reinforced foaming plastics, in which the angle between the two legs 20,21 is 90°, and in which the angles between the third leg 22 and the legs 20,21 both are 135°.

Flat-oval, hollow rail tubes 15,16 are connected with the legs 20,21, and a connecting piece in the shape of a flat-oval, hollow tube 9 is connected with the leg 22.

The tubes 9,15,16 each have an aperture 23 which is positioned in front of a transverse hole in the leg placed in the tubes and which is adapted for a screw, by means of which the two connecting members of the assembly means 10 can be moved apart.

The assembly means 10 further comprises a protruding middle section 24, the surface of which is end to end with surface of the tubes and which comprises a through-going hole 25.

At the end of the leg 22 a through-going hole 26 is likewise provided, said hole being positioned in front of an opening 27 in the connecting piece 9.

Figure 3:
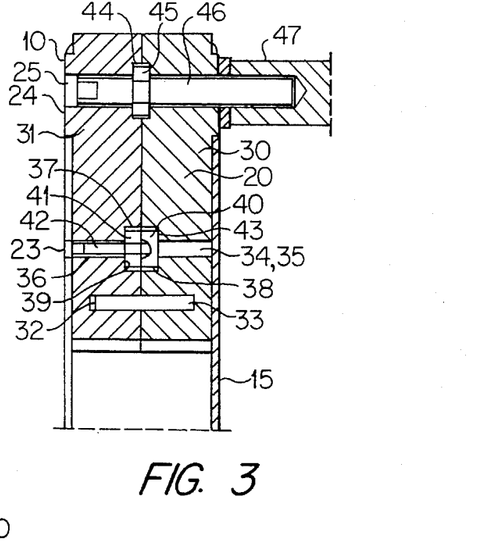
FIG. 3 is a longitudinal view of the assembly means with tubes according to FIG. 2 along the line III—III.
Figure 4:
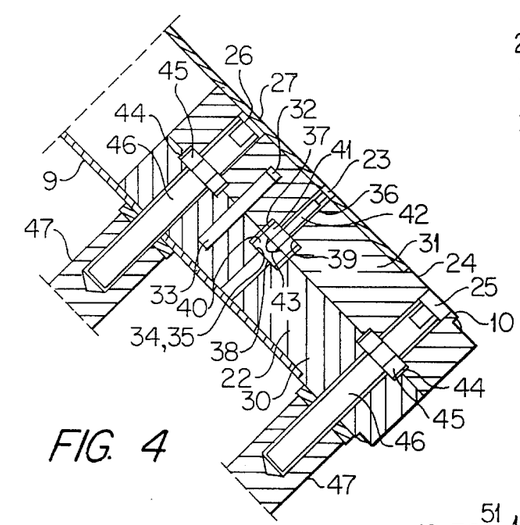
FIG. 4 is a longitudinal view of the assembly means shown in FIG. 2 with tubes along the line IV—IV.

FIGS. 3 and 4 show a longitudinal section of the assembly means 10 shown in FIG. 2 along the legs 20 and 22, respectively.

The legs 20,22 are made of two connecting members 30,31 and comprise at their free ends a transverse, cylindrical hole 32, in which a tight-fitting, cylindrical guiding pin 33 is placed.

At a distance from the free end of the legs 20,22 a through-going hole 34 is provided, said hole being positioned in front of an aperture 23 in the surrounding tube 15,9.

The walls of the holes 34 are made from two outer cylindrical portions 35,36 and an interior enlarged portion 37 with a hexagonal cross-section and with two shoulders 38,39 positioned in the connecting members 30,31 respectively.

In the interior portion 37 of the hole 34 a metal pressure plate 40 supported by shoulders 38 is provided as well as a metal nut 41 with an internal thread supported by the shoulder 39. The nut 41 has such a shape and size that it cannot pivot around the axis of the hole 34.

Furthermore, a pointed screw 21 with an external thread is provided in the hole 34. The pointed screw 42 is passed through the aperture 23 in the tubes 15,9 and brought into engagement with the nut 41, and the distal end 43 of the screw 42 abuts the pressure plate 40. The pointed screw 42 has at the end, to be reached through the aperture 23, a slot or an internal hexagon, by means of which it is possible to tighthen the screw 42 against the pressure plate 40. When tightening the screw, the two connecting members are pressed apart against the interior wall of the tube 9, whereby the assembly means and the tube are locked together in a pressure and torsion resistant connection. The strength of the connection may be further improved if two screws placed at a distance from each other are provided in each leg.

A corresponding effect as the one attained by using the two screws may be attained if a pointed screw is placed in the area at the vertex of the angle of the assembly means, said pointed screws corresponding to the screw 42 and having a corresponding engagement with a nut and a pressure plate.

The legs 20,22 are connected with a protruding middle section 24, in which a through-going cylindrical hole 25 is made. The hole 25 is placed at the place, where the extra screw in the vertex of the angle should be placed. The provision of a through-going hole 25 does not, however, prevent the two connecting membrs from being pressed apart in the area at the vertex of the angle, as a special arrangement can be used, which arrangement will be explained in the following in connection with a particular embodiment of the assembly means.

At the end of the leg 22 a through-going, cylindrical hole 26 positioned in front of an aperture 27 in the tube 9 is provided.

The holes 25,26 comprise both at their middle an extension 44 with a hexagonal cross-section, in which a nut 45 with an internal thread is placed.

In each of the holes 25,26 a pointed screw 46 with an external thread is provided, said screw being screwed into the nut 45. The pointed screw 46 protrudes from the assembly means 10, and on the protruding part of the pointed screw 46 a metal tube 47 with an internal thread is mounted, said tube being a supporting element for a superstructure to the table.

Figure 5:
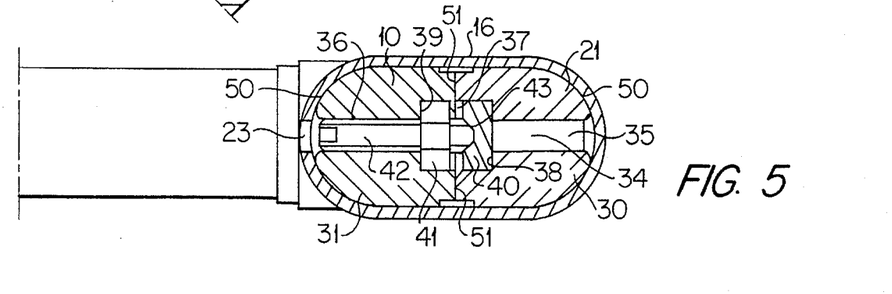
FIG. 5 is a cross-section of the assembly means shown in FIG. 2 with tubes along the line V—V.

FIG. 5 shows a flat-oval, hollow tube 16 with an aperture 23 and holding a leg 21 of an assembly means 10, which comprises two connecting members 30,31, each comprising a rounded side 50 abutting on the interior, rounded sides of the tubes 16, and a flat side 51, which faces the other connecting member. The two connecting members 30,31 fill out together substantially the whole cross-section of the tube 16.

In the leg 21 a through-going hole 34 is provided, said hole comprising two outer cylindrical portions 35,36 and an interior enlarged portion 37 with hexagonal cross-section and with two shoulders 38,39 positioned in the connecting members 30,31.

In the interior portion 37 of the hole 34 a metal pressure plate 40 is provided, said plate being supported by the shoulder 38, and a metal nut 41 with an internal thread supported by the shoulder 39. The nut 41 has such a shape and size that it cannot pivot around the axis of the hole 34.

Furthermore, a pointed screw 42 with an external thread 42 is provided in the hole 34. The pointed screw is passed through the aperture 23 in the tube 16 and brought in engagement with the nut 42, and the distal end 43 of the screw 42 abuts the the pressure plate 40.

The assembly means may be produced by casting, for instance pressure diecasting, from aluminum or a zinc casting alloy, such as zamak. It is, however, preferred to manufacture the assembly means by casting from a fibre-reinforced, expanded plastic material, preferably a thermoplastics. An example of such a material is IXEF 1022, manufactured by Solvay S. A., Be-1050 Brussels.

Figure 6:
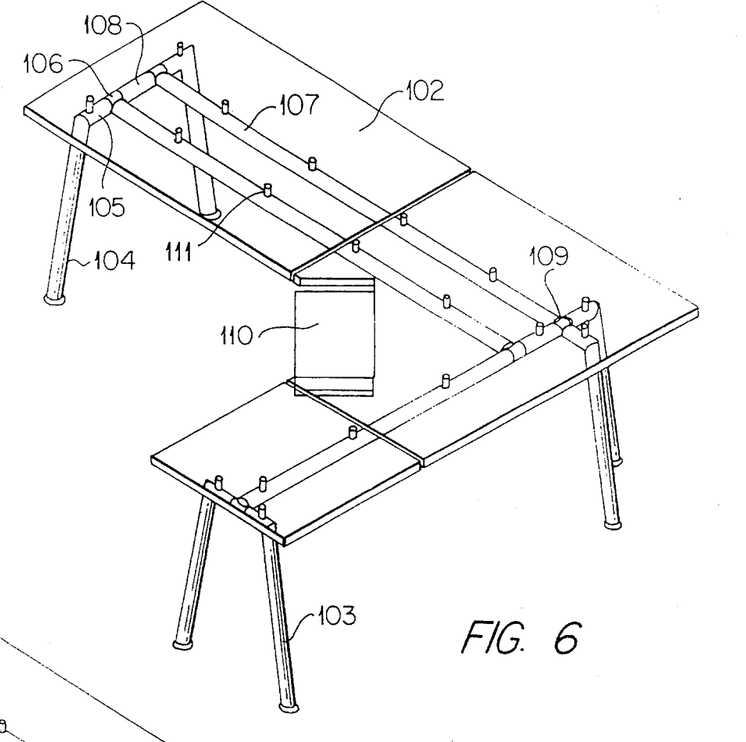
FIG. 6 is a perspective of another embodiment of a table according to the invention.

FIG. 6 is an alternative embodiment of a piece of furniture according to the invention in the shape of an angular working table. To make the drawing clear the top 102 of the table is only indicated by its outlines. The tabletop rests on a lower frame comprising frame legs 103, which in the exaple shown are made up of tubes with circular cross-section. Each leg comprises an oblique table leg 104 and a connecting piece 105 connected by means of an assembly means 106 to either a rail tube 107,108 or another connecting piece 105. In this embodiment the angle between the table leg 104 and the connecting piece is different from 90°. The assembly means 106 have three legs, two of which are placed with a common axis and the third one forms an angle of 90° with the two other ones. One of the assembly means 109 has four legs placed in pairs along axis intersecting each other under a right angle, but, besides, the assembly means 109 is as described in connection with FIGS. 2–5. On account of the oblique positioning of the table legs and the connecting pieces the rail tubes will be positioned at such a distance from the edge of the table that they will not be in the way of a person sitting at the table or prevent recesses from being made for lowered table top sections 110 for keyboards or the like. In the embodiment shown the tabletop is fastened to the lower frame by means of distance pieces 111, which are partly mounted on the frame tubes 107 partly mounted on the connecting pieces 105. For ensuring a correct mounting of the frame legs in a vertical plane the connecting pieces and the assembly means are provided with co-operating recesses and guiding projections, which will be described later.

Figure 7:
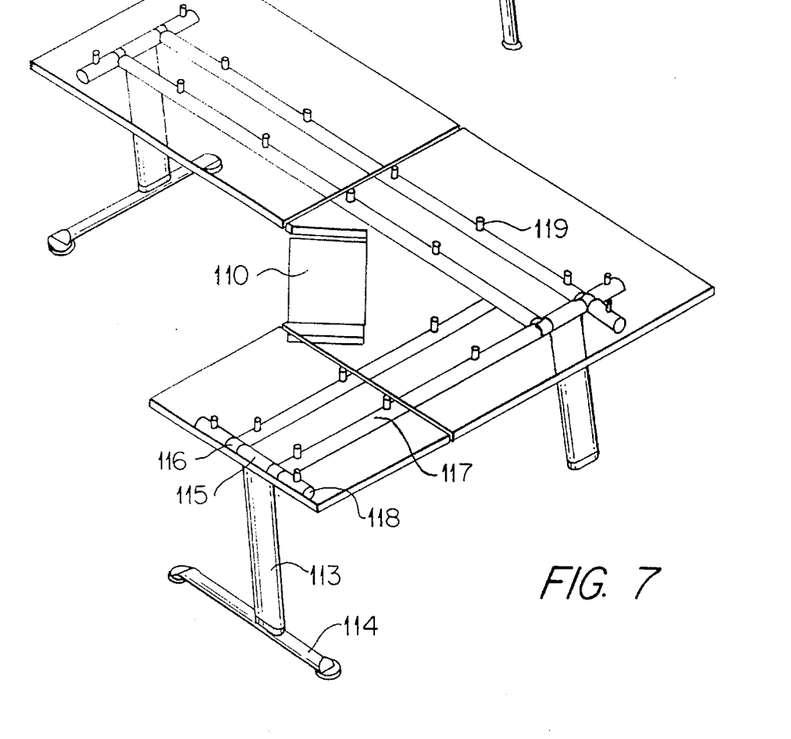
FIG. 7 is a perspective of an embodiment of a table according to the invention, in which the legs are shaped as column legs.

The table shown in FIG. 7 illustrates a third embodiment of the piece of furniture according to the invention. The tabletop 112 is, to show the frame more clearly, only indicated at its outlines. The frame comprises column legs 113 ending downwards in support runners 114. The column legs, which for the sake of attaining sufficient strength is shaped as oval tubes with an elongated cross-section, and at the top by a connecting piece 115 in the form of a transverse tube which is somewhat longer than the width of the column leg. By means of assembly means 116 the connecting piece is connected with the rail tubes 117 and possibly support tubes 118 supporting the tabletop 112. Like in the embodiment according to FIG. 6 the tabletop 112 is fastened to the frame by means of distance pieces 119. The assembly means are as descried in connection with FIGS. 2–5 and comprise elements with three or four legs. If the tabletop is made with sufficient rigidity for being self-supporting by anchoring only to the frame tubes 117, the support tubes 118 may be omitted, whereby the assembly means may be shaped as angle pieces with only two legs positioned under a right angle.

Figure 8A:
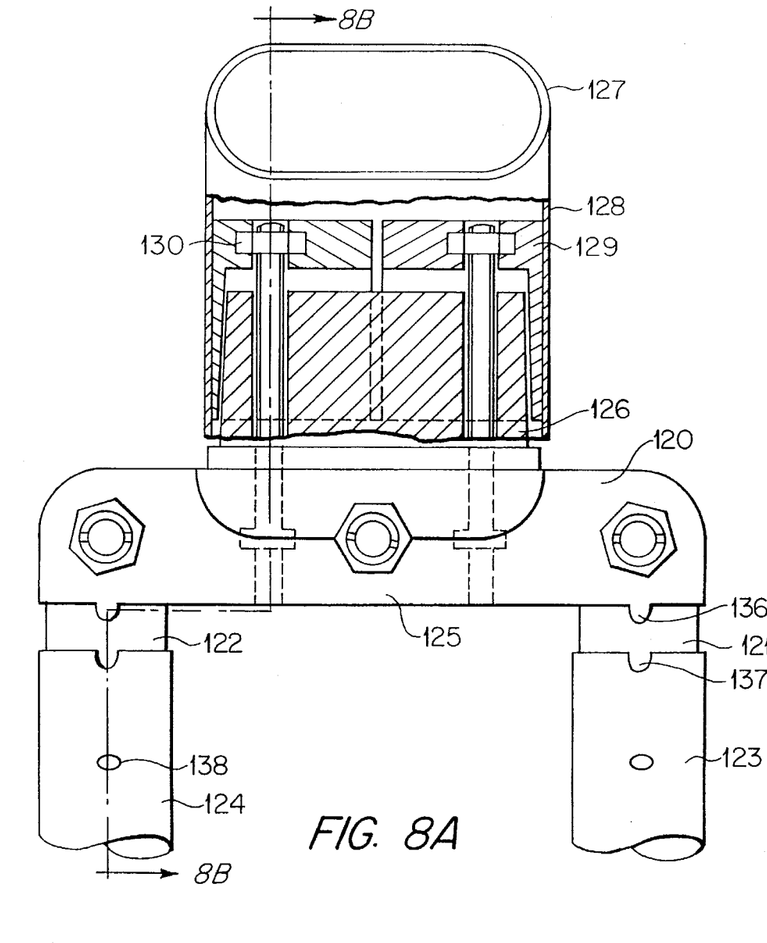
FIGS. 8A and 8B show a detail in an assembly means for use in another embodiment of a piece of furniture according to the invention.
Figure 8B:
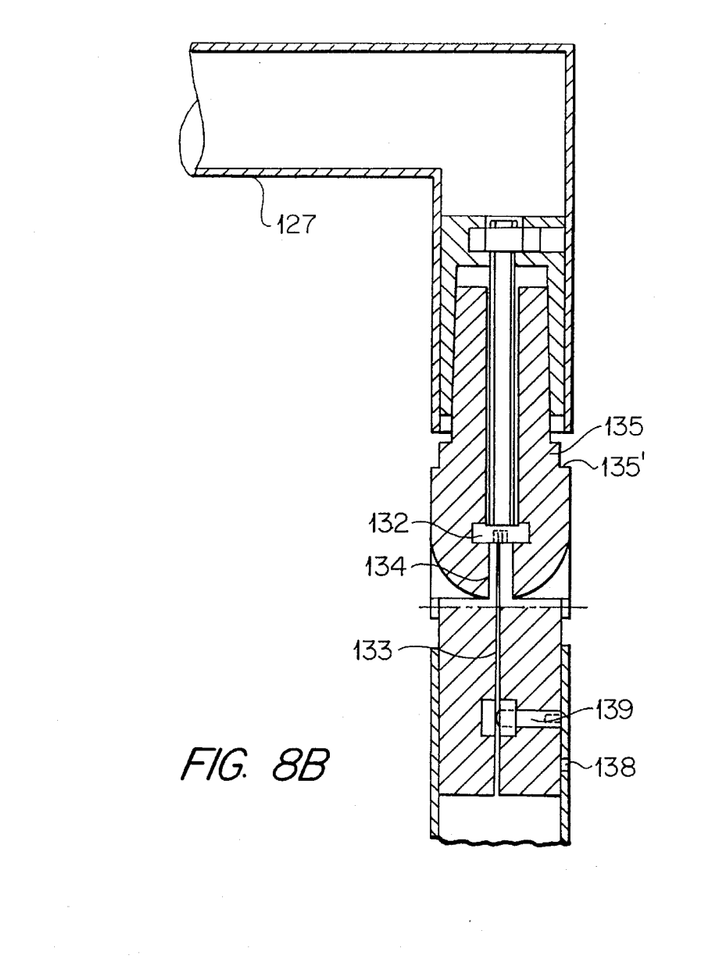

In the embodiment according to FIG. 7 the connection piece on the column leg is placed perpendicular to the column leg itself and parallelly with the longitudinal direction of the cross-section. FIGS. 8A and 8B show a detail in an assembly means for use in connection with pieces of furniture with column legs, in which the column legs are provided with a connecting piece running perpendicular to the long axis of the cross-section of the column leg. FIG. 8A shows an assembly means 120 seen in plane. The assembly means comprises two legs 121 and 122, by means of which the assembly means may be connected to two rail tubes 123 and 124 running parallelly. The two legs are connected by means of a middle piece 125, the length of which corresponds to the distance between the frame tubes 123,214. Parallel with the legs 121,123, but oppositely directed, a central leg is placed on the middle piece, said leg being adapted to be connected with the connecting piece 128 of the column leg. Contrary to the legs 121,122, which are expanded by means of a transverse screw 139 (FIG. 8B), as explained in connection with FIGS. 2–5, the leg 126 is provided with an axially displaceable, two-piece expansion sleeve 129. In the expansion sleeve 129 nuts 130 or corresponding elements with an internal thread co-operating with fastening screws 131 are embedded. The fastening screws have an internal hexagon or corresponding engagement means, by means of which the screws 131 may be turned by means of a suitable key thorugh a hole in the middle piece 1. As will be seen from FIG. 8B, which shows a section through the joint shown in FIG. 8A, the screws are provided with heads which are embedded in recesses 132 in the dividing surface 133 of the assembly means, said screws being accessible through the hole 134. By fastening the expansion sleeve 131 the connecting piece is simultaneously pulled in over a guide 135 placed on the middle part towards a breast 135' placed on the middle section. By the combined fastening and explansion a very stable connection is established which can resist both bending and torsional stress.

At the connection between frame tubes 123,124 and the otehr legs 121,122 guiding projections 136 are provided where the middle section changes to legs in order to stabilize the connection, said guiding projections co-operating with corresponding recesses 137 made in the end surface of the frame tubes 123,124. These guiding projections facilitate the assembling of the frame, the rail tubes being oriented correctly during the assembling, whereby the aperture 138, through which the screw 139 for expanding the legs 121,122 is to be fastened, gets correctly positioned in front of the screw. The guiding projections 136 also contribute in particular during the assembling of the frame to the transfer of torsional strength.

Figure 9:
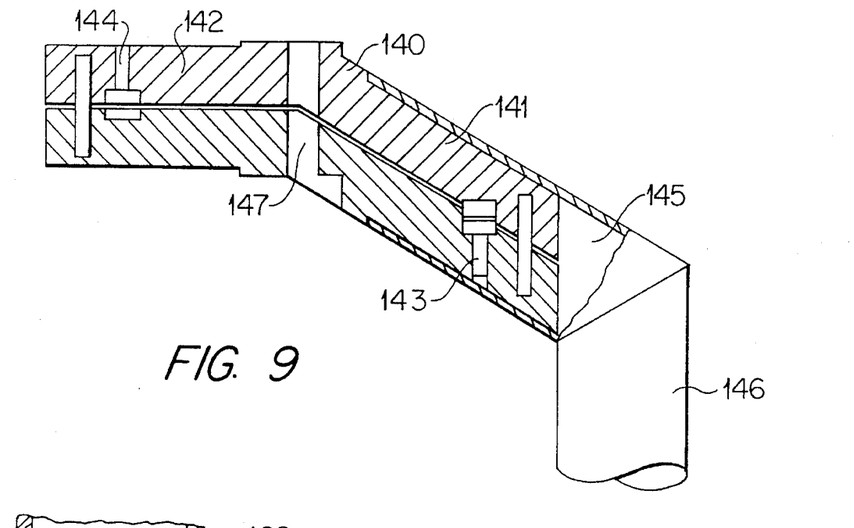
FIG. 9 is an assembly means in which one leg for connection with a connecting piece forms an angle with a plane through the remaining legs.

FIG. 9 shows a section through an assembly means 140, in which one of the legs 141 forms an obtuse angle with a plane through the remaining legs, of which only the leg 142 is visible in the section shown. In the embodiment shown the screws 143,144, by means of which the legs 141 and 142 are expanded inside the rail tubes (not shown) and the connecting pieces 145, are parallel and run perpendicular to the dividing surface in the legs connected with the rail tubes. The connecting pieces 145 are connected with the actual legs 146 with a corresponding obtuse angle in such a way that the actual leg attains the desired direction. The assembly means shown in FIG. 9 makes it possible also to let the frame leg 145,146 have the shape of a bent tube.

The middle section 147 can be provided with a throughgoing hole 148 to be used as anchoring for supporting columns for racks or the like structures or as anchoring points for drawer arrangements suspended under the frame.

Figure 10:
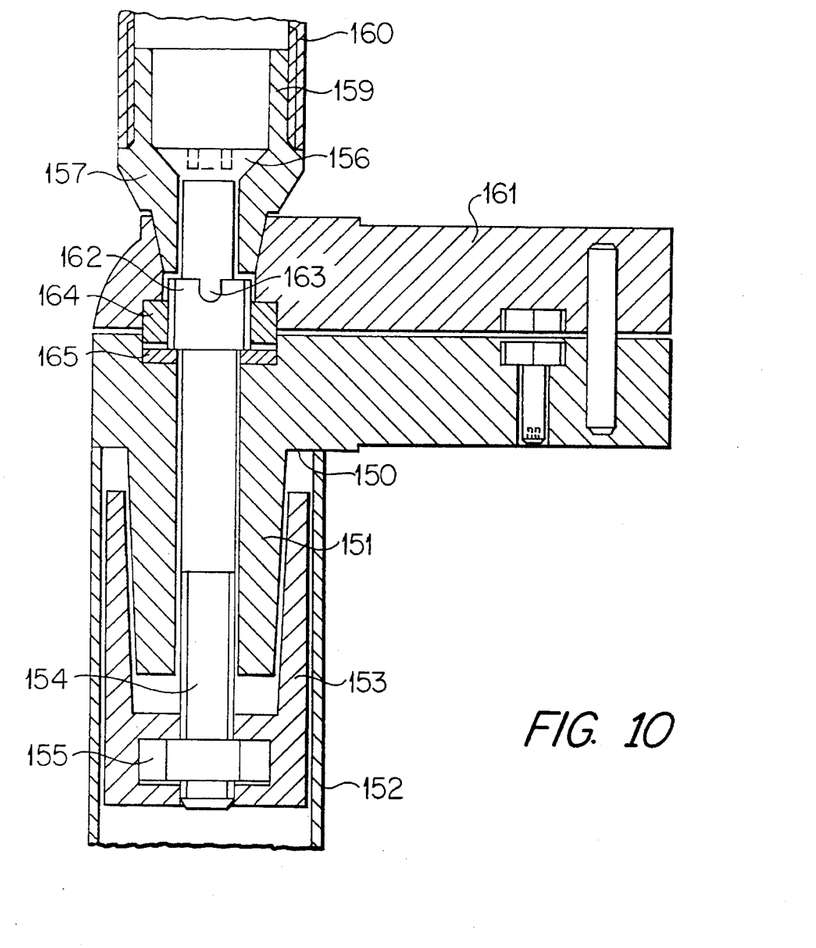
FIG. 10 is a sectional view in enlarged scale through an assembly means adapted for fastening supporting columns running perpendicularly to the plane of the rail tubes.

A particular embodiment of the assembly means is shown in FIG. 10 in an enlarged sectional view. In this embodiment a supporting column may be fastened to the middle section or an upright leg. The middle section is provided with an abutment surface 150 for the supporting column 152 as well as a central guiding cone 151, onto which an expansion sleeve 153 may be drawn by means of a fastening screw 154 passed through the middle section and the central guiding cone. The thread of the fastening screw 154 engages a nut 15 placed in the expansion sleeve 153. The fastening screw has a head 156 with an internal hexagon, in which a key for turning the screw may be inserted. The screw head rests against a sleeve 157 inserted in a conical bore 158 in the middle section. The sleeve may be provided with an upright collar 159, to which a tubular supporting column 160 may be fastened in case of a superstructure on the piece of furniture. Alternatively, the sleeve may be shorter, thus only filling the conical bore 158, but yet forming a seat for the screw head 156. By turning the fastening screw 154 the expansion sleeve may be drawn onto the central guiding cone thus expanding the latter to such an extent that the expansion sleeve presses against the inner side of the support column 152 and presses its end surface against the breast 150. To prevent the fastening screw from pressing the two connecting pieces together thereby reducing the expansion of the legs intended for holding the frame tubes and connection pieces, a device has been placed in the middle section for pressing the two connecting pieces apart. The device consists of a sleeve 162 with an external thread and with a clear, through which the fastening screw passes freely. The sleeve is provided with notches allowing the insertion of a key for turning the sleeve. The sleeve is inserted in a nut 164 placed in one of the connecting members and abuts at the end opposite the notches 163 on a ring 165 placed in the other connecting member. When assembling a furniture frame the sleeve 163 is tightened with the key adapted thereto after the rail tubes have been mounted and fastened by means of the pointed screws placed in the legs, but before the insertion and tightening of the fastening screw 154. The pull of the fastening screw can effectively be absorbed by the device described.

I claim:

1. A piece of furniture (1) comprising an upper part (2) and a lower part, the lower part comprising rails (8) and legs (3, 4, 5, 6, 7) at least partly consisting of tubes; said legs having an upper tubular end comprising a tubular connecting piece (9) fixedly connected with and forming an angle with the leg;

assembly means (10, 11, 12, 13, 14) comprising two connecting members (30, 31) each comprising at least two legs (21, 22), one leg of each member being inserted in an end of the connecting piece (9) and at least one other leg of each member being inserted in a tubular end of a rail (8);

one of the legs of the assembly means forming an angle with at least one other leg of the assembly means;

the connecting members being pressed against an inner side of the tubular rails and connecting pieces by means of screws passing through holes in the legs of the connecting members, the legs of the connecting members having a size and shape which substantially fills up an interior of the tubular ends and the screws being accessible through an aperture in a wall of each of the tubular ends of the rails and connecting pieces.

2. A piece of furniture according to claim 1, wherein the assembly means in the area at the vertex of the angle comprises means for pressing the two connecting members apart.

3. A piece of furniture according to claim 2, wherein said means for pressing the connecting members apart comprises an externally threaded sleeve which forms a is a part of the hole (25), and a thread of which engages a nut placed in a recess in one of the connecting pieces and the other end of which presses against an annular pressure element.

4. A piece of furniture according to any one of the claim 1, wherein said rails, legs and connecting pieces consist of tubes with a circular cross section, and wherein the assembly means are of such a shape that the cross section of the legs of the two connecting members is a sector of a circle forming a rounded part, and in an outer part of the rounded part of each leg in at least one of the connecting members and perpendicular to the flat side of the connecting member a hole is provided, in which a tight-fitting guiding pin protruding from the rounded part of the leg of the connecting member is placed.

5. A piece of furniture according to claim 1, in which the upper part (2) has a polygonal base, wherein each leg (3, 4, 5, 6, 7) is located adjacent one corner of the upper part in such a way that a longitudinal axis of the connecting piece (9) runs in a vertical plane approximately parallel with a vertical plane containing a bisector of the upper part corner.

6. A piece of furniture according to claim 1, wherein the assembly means (10, 11, 12, 13, 14) which includes two connecting members are made by casting, and in one of the connecting members a nut (41) for the screw (42) is placed, and in the other connecting member (30, 31) a separate pressure element (40) is mounted, against which element the screw (42) presses.

7. A piece of furniture according to claim 6, wherein the nuts (41) and the pressure elements (40) in the legs of the assembly means are positioned in such a way that the screws of each assembly means extend parallel to one another.

8. A piece of furniture according to claim 1, wherein an area at the free end of each leg (20, 21, 22) includes a transverse hole (32), in which a guiding pin (33) running parallel with a screw is mounted.

9. A piece of furniture according to claim 1, wherein the legs of the assembly means border a middle section (24) delimited against the tubes by a breast of a size corresponding to the wall thickness of the tubes (9, 15, 16, 17, 18).

10. A piece of furniture according to claim 9, wherein on a collar in a middle section a guiding abutment is positioned for engagement with a corresponding recess in an end of the connected tube.

11. A piece of furniture according to claim 9, wherein a hole (25) is provided in the middle section (24), said hole having in an area of a dividing surface of the assembly means a recess for holding a bolt head or a nut.

12. A piece of furniture according to claim 11, wherein the middle section comprises at least one contact face for a tubular carrying column and a central guiding cone for an expansion member for anchoring the carrying column.

13. A piece of furniture according to claim 1, further including an under frame comprising column legs with support runners mounted at opposite ends of the upper part, wherein the assembly means are shaped as a double angle with two parallel legs adapted for being inserted in each of two parallel frame tubes and an oppositely directed central leg adapted for being inserted in a connecting piece on the column leg.

14. A piece of furniture according to claim 13, wherein the central leg comprises a two-piece expansion sleeve and means for axial tightening of said expansion sleeve.

* * * * *

UNITED STATES PATENT AND TRADEMARK OFFICE
CERTIFICATE OF CORRECTION

PATENT NO. : 5,598,790
DATED      : February 4, 1997
INVENTOR(S): Preben B. Fich It is certified that error appears in the above-indentified patent and that said Letters Patent is hereby corrected as shown below:

Col. 10, line 60 (Claim 3, line 3) delete "is a".

Col. 10, line 64 (Claim 4, line 1) delete "any on of the".

Col. 12, lines 3 and 4 (Claim 9) after "corresponding" insert -- at least --.

Signed and Sealed this

Third Day of June, 1997

Attest:

BRUCE LEHMAN

Attesting Officer

Commissioner of Patents and Trademarks